April 7, 1970  R. K. FRILL  3,504,698
VARIABLE LOAD RELAY VALVE DEVICE
Filed Aug. 5, 1968

INVENTOR.
RICHARD K. FRILL
BY
*A. G. Steinmeier*
ATTORNEY

United States Patent Office 3,504,698
Patented Apr. 7, 1970

3,504,698
VARIABLE LOAD RELAY VALVE DEVICE
Richard K. Frill, Pittsburgh, Pa., assignor to Westinghouse Air Brake Company, Wilmerding, Pa., a corporation of Pennsylvania
Filed Aug. 5, 1968, Ser. No. 750,190
Int. Cl. B60t 8/18; F16k 31/163
U.S. Cl. 137—495
5 Claims

ABSTRACT OF THE DISCLOSURE

A relay valve device operable responsively to the degree of vehicle air spring pressure as determined by the vehicle load for effecting delivery of brake-actuating fluid to the brake cylinder at a pressure commensurate with the vehicle load, said relay valve device being characterized by fail-safe means operable for causing the relay valve device to effect at least the delivery of fluid pressure corresponding to a minimum brake application consistent with an "empty" load condition of the vehicle in the event of failure of air spring pressure.

BACKGROUND OF THE INVENTION

Figure 2:
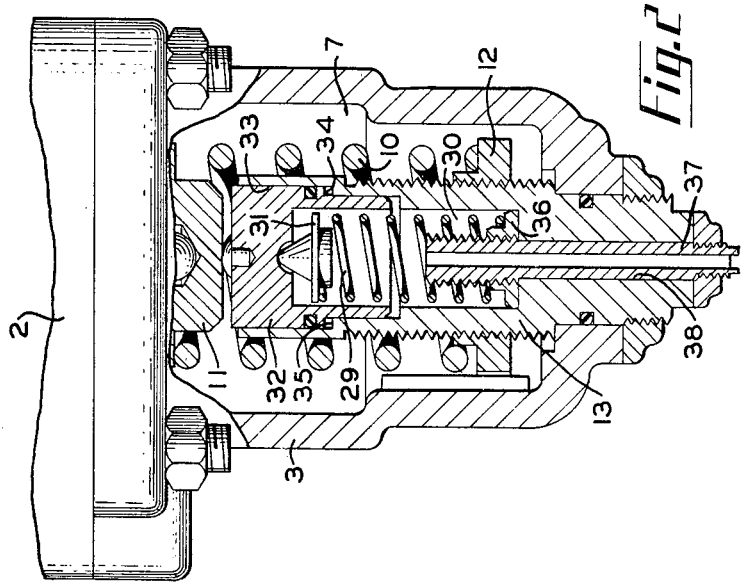

With vehicles equipped with air springs, which are charged with fluid pressure corresponding to the vehicle load, it is common practice, when it is desired to effect a brake application on the vehicle at a degree corresponding to the degree of vehicle load, to utilize the air spring pressure for controlling the brake-applying equipment and thereby effect a brake application determined by the degree of said air spring pressure which, as noted, reflects the load condition of the vehicle. For accomplishing this purpose, a variable load relay valve device is usually incorporated in the braking equipment and includes a differential pressure piston subjected on one side to air spring pressure and on the opposite side to actuate fluid pressure delivered to the brake cylinder. When the force of air spring pressure acting on the one side of the piston is balanced by the force of actuating pressure acting on the opposite side, said piston moves to a cut-off position to effect seating of a check valve. Seating of the check valve terminates further delivery of actuating pressure to the brake cylinder, and thereby establishes a maximum degree of braking pressure as determined by the degree of air spring pressure acting on the one side of the piston.

It is possible, however, that, for some reason such as rupturing of the air spring bag or leakage of air spring pressure at a rapid rate, an effective pressure cannot be established on the one side of the piston, thereby rendering the load relay valve device ineffective for limiting the brake application to a degree corresponding to vehicle load.

In the type of variable load relay valve device above described, an adjustable tuning spring is commonly provided therein and acts jointly with air spring pressure on the one side of the differential piston for maintaining the check valve in an unseated or open position until the opposing forces acting on the respective opposite sides of the piston become balanced, whereupon the check valve is operated to its seated or closed position. It was considered that the compression of the tuning spring could be increased to such an extent that in the event of total loss of air spring pressure, the spring would exert a force on the piston sufficient for producing a minimum brake application equivalent to an "empty" load condition of the vehicle. Increasing the compression of the tuning spring to such an extent, however, to merely provide for a contingent failure of air spring pressure, would prove undesirable in that, with air spring pressure at a normal degree, the combined forces of the increased compression of the tuning spring and normal air spring pressure acting on the one side of the piston would necessitate a higher degree of actuating fluid pressure acting on the opposite side to balance said combined forces, and, therefore, result in a degree of brake application exceeding that desired for the actual load situation. On the other hand, if the compression of the tuning spring is adjusted for normal operation, the force of said tuning spring alone, in the event of total loss of air spring pressure, would be inadequate and would effect a brake application of an intolerably low degree even for an empty load condition.

SUMMARY OF THE INVENTION

The object of this invention, therefore, is to provide an improved variable load relay valve device of the type for use on vehicles equipped with air springs, said variable load relay valve device being operable responsively to the existing degree of air spring pressure for limiting the degree of brake application on the vehicle to a certain maximum corresponding to the existing load condition of the vehicle reflected by said air spring pressure and being characterized by means effective, in the event of an inadvertent loss or reduction of said air spring pressure to a degree of ineffectiveness, for causing the variable load relay valve device to effect, at least, an application commensurate with an empty load condition.

The invention comprises an improved variable load relay valve device having the usual differential pressure piston opposingly subjected on one side to the force of actuating fluid pressure delivered to the brake cylinder and on the opposite side to the combined force of a tuning spring and air spring pressure for normally maintaining a check valve in an unseated position in which said actuating fluid is delivered to the brake cylinder, and effective, upon attainment of a balanced state of said forces, for causing said check valve to move to a seated position in which further delivery of actuating fluid to the brake cylinder is cut off, said improved variable load valve device being characterized by an auxiliary spring for exerting a force on said opposite side of said differential pressure piston in a direction coinciding with that of the force of said tuning spring and air spring pressure, and an auxiliary piston subject and operable responsively to said air spring pressure above a certain value for retaining said auxiliary spring in a restrained position in which the force exerted thereby is isolated from said differential pressure piston. In the event of a failure or unintentional reduction of air spring pressure below said certain value, the auxiliary spring becomes effective for insuring, at least, a minimum brake application equivalent to an empty load situation.

Figure 1:
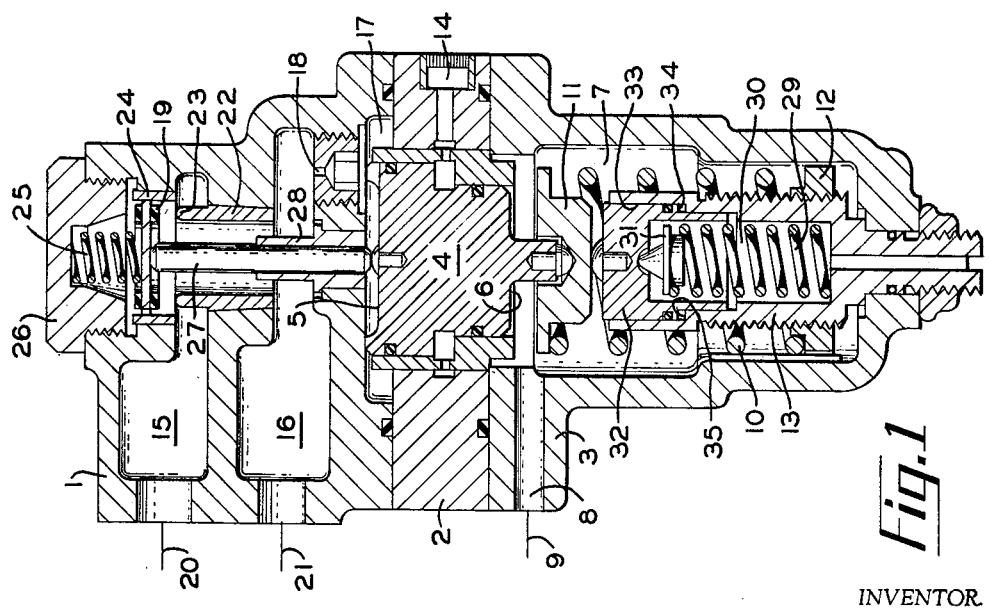

In the single-sheet drawing, FIG. 1 is an elevational view, in section, of an improved variable load relay valve device embodying the invention; and FIG. 2 is a fragmentary view, in section and on a larger scale, of the valve device shown in FIG. 1 with certain modifications incorporated therein.

DESCRIPTION AND OPERATION

As viewed in FIG. 1 of the drawing, the improved variable load relay valve device embodying the invention comprises an upper casing section 1, an intermediate casing section 2, and a lower casing section 3.

A valve-operating or main piston 4, reciprocably operable in the intermediate casing section 2 and the lower casing section 3, has an upper pressure area 5 adjacent the upper casing section 1 and a lower pressure area 6 adjacent said lower casing section, said lower pressure area being smaller than the upper pressure area.

The lower pressure area 6 is exposed and subject to pre-established air spring pressure in a pressure chamber 7 formed in the lower casing section 3 and charged with such air spring pressure via a passageway 8 formed in said lower casing section and connected to the vehicle air springs (not shown) via a pipe 9. The degree of air spring pressure in chamber 7, therefore, is pre-established by and reflects the existing load condition of the vehicle. A biasing or tuning spring 10 cooperates with air spring pressure in chamber 7 for urging main piston 4 toward a supply position, which will be defined hereinafter. Tuning spring 10 is compressed between a spring seat 11, resting against the lower end of main piston 4, and an oppositely disposed spring seat 12. Spring seat 12 is fixed against rotation in the casing by suitable means such as an axially disposed rib formed on the inner wall of the lower casing section 3, which rib is engaged by a complementary notch formed adjacent the periphery of said spring seat, so that the axial position of spring seat 12 relative to spring seat 11 may be adjusted by turning an adjusting screw 13 screwed into a threaded bore in spring seat 12 for varying the compression of the tuning spring 10 as desired. An atmospheric vent passage 14 formed in intermediate casing section 2 permits reciprocable motion of piston 4 free of dash-pot action.

The upper casing section 1 has formed therein a supply chamber 15 and a delivery chamber 16, said upper casing section cooperating with the intermediate casing section 2 and piston 4 to define a piston chamber 17 connecting with said delivery chamber via a passageway 18, the upper pressure area 5 of said piston being subjected, therefore, to the fluid pressure prevailing in said delivery and piston chambers. A check valve 19 is disposed in the upper casing section 1 and cooperates (in a manner to be hereinafter disclosed) with piston 4 for controlling communication and, therefore, flow of fluid under pressure between supply chamber 15, which is supplied via a pipe 20 with actuating fluid at a controlled pressure from a source (not shown), and delivery chamber 16, from which said actuating fluid is delivered via a pipe 21 to a device, such as a brake cylinder (not shown), to be operated thereby.

A valve seat member 22 is fixed in a separating wall in the upper casing section 1 between supply chamber 15 and delivery chamber 16, said valve seat member having formed thereon an annular valve seat 23 on which the check valve 19 rests when in a seated or closed position in which communication between said chambers is cut off, said communication being open, of course, in an unseated or open position of said check valve. The check valve 19, which is axially slidably disposed in an axially aligned bushing 24 fixed in the upper casing section 1, is urged toward its seated position on valve seat 23 by a spring 25 compressed between said check valve and a cap nut 26 screwed into a threaded bore in said upper casing section.

A piston stem 27 is slidably disposed in a guide bushing 28 fixed in an end wall of upper casing section 1 adjacent intermediate casing section 2, said stem being axially aligned with and between check valve 19 and piston 4 so as to be in contact with the lower and upper sides thereof, respectively. Thus, upon upward movement of piston 4 to its supply position in which it is shown and wherein it engages the lower face of casing section 1, the check valve 19 is lifted from valve seat 23 and held in its unseated or open position, and upon downward movement of the piston to a cut-off position, spring 25 causes said check valve to move to its seated or closed position, above described.

According to the invention, an auxiliary spring 29 is caged in a recess 30 formed coaxially in the adjusting screw 13 and is compressed between the bottom of said recess, on which one end of said spring rests, and a spring seat 31 against which the opposite end of said spring rests. An auxiliary piston 32 is reciprocably and coaxially disposed in a counterbore 33 of the recess 30 in the adjusting screw 13, and has the bottom thereof, as viewed in FIG. 1, resting on the spring seat 31. The auxiliary piston 32 is urged by auxiliary spring 29, acting through spring seat 31, toward an operative position in which it is in contact with the bottom side of spring seat 11, as viewed in the drawing, and in which the biasing effect of said auxiliary spring is transferred through spring seat 31, auxiliary piston 32, and spring seat 11 to act on main piston 4. When chamber 7 is charged with air spring pressure exceeding a certain critical value, auxiliary piston 32 is moved downwardly, against the opposing effect of auxiliary spring 29, to an inoperative position in which the biasing effect of auxiliary spring 29 is removed from main piston 4, said inoperative position being defined by engagement of a shoulder 34 on the auxiliary piston with a complementary shoulder 35 formed at the lower extremity of counterbore 33.

In considering the operation of the improved variable load relay valve device under normal conditions, it will be assumed that chamber 7 is charged with air spring pressure exceeding the certain critical value, above noted, so that auxiliary piston 32 is in its inoperative position, above defined, and main piston 4 is in its supply position. With main piston 4 in its supply position, check valve 19 is held in its unseated position by the piston stem 27.

Assuming that a brake application is initiated by the operator, in a manner not deemed essential to an understanding of the present invention, actuating fluid, at a preselected pressure in accordance with the degree of brake application desired, is supplied via pipe 20 to supply chamber 15, whence it flows past the unseated check valve 19 to delivery chamber 16 and via pipe 21 to the brake cylinder (not shown) for effecting the brake application. At the same time, such actuating fluid pressure also prevails, via passageway 18, in piston chamber 17 and on pressure area 5 of the main piston 4. If the pressure of actuating fluid prevailing in piston chamber 17, and therefore, the force of such pressure acting on pressure area 5 is insufficient for overcoming the opposing combined force of tuning spring 10 and air spring pressure acting on pressure area 6, main piston 4 remains in its supply position and check valve 19 is held in its unseated or open position. If actuating fluid under pressure is released by the operator for effecting a release of the brake application, the brake cylinder and both the supply and the delivery chambers 15 and 16, respectively, as well as piston chamber 17 are relieved of said actuating fluid under pressure without causing any change in the relative positions of the main piston 4 and the check valve 19.

If, on the other hand, the pressure of actuating fluid in supply chamber 15, and therefore in delivery chamber 16 and piston chamber 17, is either increased to or resupplied at what may be called a cut-off pressure, that is, a pressure producing a force acting on pressure area 5 of main piston 4 sufficient for balancing the combined force of tuning spring 10 and air spring pressure acting on pressure area 6, said main piston, as a result, is operated to its cut-off position so that spring 25 may then move check valve 19 to its seated position. With check valve 19 in its seated position, further flow of actuating fluid from supply chamber 15 to delivery chamber 16, and therefore to the brake cylinder, is cut off, notwithstanding that the operator, in an attempt to increase the degree of brake application in effect, causes the pressure of said actuating fluid in said supply chamber to be increased to a degree exceeding the degree of cut-off pressure, above defined. Once seated, the check valve 19 is held in its seated position by spring 25 assisted by pressure of actuating fluid in supply chamber 15 which flows through a plurality of angularly spaced openings or notches formed in the periphery of said check valve to act on the upper side thereof. Thus, the maximum pressure of actuating fluid deliverable to the brake cylinder, that is, the pressure at which the opposing forces acting on main piston 4 are in a balanced state, is limited by the prevailing load condition of the vehicle in that said load condition determines the degree of air spring pressure in chamber 7 and, consequently, the force produced thereby on pressure area 6.

The improved variable load relay valve device embodying the invention, therefore, in the manner above described, operates to effect any degree of brake application up to a maximum application for the given load.

In order to release the brake application, whether such application is a maximum application or one of a lesser degree, the operator need simply effect release of actuating fluid pressure in the supply chamber 15 (in a manner not deemed essential to an understanding of the present invention). If the application thus released is one less than a maximum application (in which case check valve 19 is in its unseated position), actuating pressure from the brake cylinder (not shown) simply flows back through pipe 21, delivery chamber 16, past unseated check valve 19, through supply chamber 15, and out pipe 20 to an atmospheric vent (not shown). If the brake application to be released is a maximum application for the existing load (in which case main piston 4 is in its cut-off position and check valve 19 is in its seated position), actuating fluid pressure in supply chamber 15, and, therefore, acting on the upper side of said check valve is released, whereupon the pressure in delivery chamber 16 acting on the lower side of said check valve on the area enclosed within the valve seat 23 is effective for overcoming spring 25 and unseating said check valve. Actuating fluid pressure flowing from the brake cylinder to atmosphere follows the course above described, and main piston 4, due to relief of pressure acting on pressure area 5, moves to its supply position for holding check valve 19 in its unseated position until such time that a maximum application is again effected.

The improved variable load relay valve device functions in the manner above set forth as long as air spring pressure prevailing in chamber 7 is effective for urging main piston 4 toward its supply position and for retaining auxiliary piston 32 in an inoperative position out of contact with spring seat 11. In the event that air spring pressure in chamber 7 either fails completely or leaks at such a rate as to drop below a certain low pressure and, therefore, be ineffective for biasing main piston 4 toward its supply position, auxiliary spring 29 is rendered effective for moving auxiliary piston 32 to its operative position, above described, in contact with spring seat 11, and thus, acting through said spring seat, exerts an auxiliary force on said main piston to cooperate with that of main spring 10 for urging said main piston toward its supply position. The auxiliary spring 29 is of such preselected compression rating that the pressure of actuating fluid supplied to delivery chamber 16 and acting on pressure area 5, in order to produce a force for balancing the opposing effective force exerted jointly by said auxiliary spring and main spring 10, must be of such a degree as to produce, at least, a brake application equivalent to a maximum application recommended for an "empty" load condition of the vehicle.

With main piston 4 operated to its supply position by the combined forces exerted by auxiliary spring 29 and main spring 10, the variable load relay valve device operates in the manner described above for effecting delivery of actuating fluid pressure to the brake cylinder up to a pressure limit determined by seating of check valve 19 when the opposing forces acting on main piston 4 are balanced. Release of the brake application is effected in a manner similar to that discussed hereinbefore.

Since the weights and air spring pressures of vehicles, on which the improved variable load relay valve device may be used, vary widely, the compression of auxiliary spring 29 and, therefore, the force exerted thereby on the main piston 4 should be compatible with the weight and air spring pressure of the particular vehicle on which it is intended to be used in order to produce the desired braking effect for an "empty" load condition of said particular vehicle in the event of air spring pressure failure. In order to eliminate the necessity of providing a number of auxiliary springs 29 corresponding to the various number of vehicles of different weights and air spring pressures, the arrangement shown in FIG. 2 of the drawing provides means for adjusting the compression of the auxiliary spring 29. As shown, the auxiliary spring 29 is compressed between the spring seat 31 at one end and a second spring seat 36 at the opposite end. The axial position of spring seat 36, which is fixed against rotation relative to adjusting screw 13 in a manner similar to that described above in connection with spring seat 12, is adjustable relative to spring seat 31 by an adjusting screw 37 freely and coaxially rotatable within a coaxial bore 38 formed in the adjusting screw 13.

With the compression of auxiliary spring 29 adjusted to the compression desired, the variable load relay valve device shown in FIG. 2 functions in a manner similar to the device shown in FIG. 1 and above described.

Having now described the invention, what I claim as new and desire to secure by Letters Patent is:

1. A relay valve device comprising a normally unseated valve controlling the supply of fluid under pressure from a fluid pressure inlet to a fluid pressure outlet, a piston device subject to a predetermined normal biasing force acting in one direction to effect unseating of said valve and subject to the opposing pressure of fluid in said fluid pressure outlet exerting a counterbalancing force acting in the opposite direction to cause operation of said valve to a closed position, wherein the improvement comprises:
 (a) normally inoperative biasing means, and
 (b) means effective upon reduction of the predetermined normal biasing force acting in said one direction on the piston device for causing said inoperative biasing means to become operative to exert an auxiliary force on said piston device in said one direction.

2. A relay valve device comprising a normally open valve controlling the supply of fluid under pressure from a fluid pressure inlet to a fluid pressure outlet, a piston subject to a normal biasing force including fluid pressure acting in one direction on said piston to hold said valve open and subject to the opposing pressure of fluid in said fluid pressure outlet exerting a counterbalancing force in the opposite direction to cause operation of said valve to a closed position, wherein the improvement comprises.
 (a) auxiliary biasing means, and
 (b) means subject to the fluid pressure acting in said one direction on said piston for holding said auxiliary biasing means inoperative so long as said fluid pressure acting in said one direction exceeds a certain value and for rendering said auxiliary biasing force on said piston in said one direction when said fluid pressure reduces below said certain value.

3. A relay valve device comprising, in combination:
 (a) a casing having formed therein:
  (i) a supply chamber to which actuating fluid for a fluid pressure responsive device is supplied at a selected pressure,
  (ii) a delivery chamber from which said actuating fluid is delivered to the fluid pressure responsive device, and
  (iii) a pressure chamber normally charged with fluid at a pre-established pressure,
 (b) spring-biased valve means disposed in said casing between said supply chamber and said delivery chamber for controlling communication therebetween, said valve means being biased toward a closed position, in which said communication is closed, and being operable to an open position in which said communication is open,
 (c) a main biasing spring,
 (d) piston means disposed in said casing for controlling operation of said valve means and having one side subject to a fluid pressure force exerted by said actuating fluid in said delivery chamber acting in one direction and an opposite side subject to a biasing force exerted jointly by said main biasing spring and the pre-established fluid pressure in said pressure chamber acting in an opposite direction,
(e) said piston means being operable responsively to a preponderance of said biasing force on said opposite side thereof to a supply position in which said valve means is operated to its said open position, and being operable responsively to a balanced state of the respective forces acting on said oppositely disposed sides to a cut-off position in which said valve is biased to its isaid closed position, wherein the improvement comprises:
(f) auxiliary means disposed in said casing and subjected to said pre-established pressure of fluid prevailing in said pressure chamber, said auxiliary means being operative, upon reduction of said pre-established pressure to a certain low value, from an inoperative position to an operative position for exerting an auxiliary force on said piston means in opposing relation to said fluid pressure force exerted thereon by the actuating fluid pressure prevailing in said delivery chamber.

4. A relay valve device, as defined in claim 3, wherein said auxiliary means comprises:
(a) an auxiliary spring for exerting said auxiliary force on said piston means, and
(b) an auxiliary piston subject to said pre-established pressure in said pressure chamber, said auxiliary piston being effective for holding said auxiliary spring inoperative so long as said pre-established pressure exceeds said certain low value and for rendering said auxiliary spring effective for exerting said auxiliary force on said piston upon reduction of said pre-established pressure below said certain value.

5. An improved relay valve device, as defined in claim 4, further characterized by means for varying the degree of compression of said auxiliary spring to thereby alter the degree of force exerted by said auxiliary spring on said piston means when the pre-established pressure acting on said auxiliary piston reduces below said certain value.

References Cited

UNITED STATES PATENTS

| 2,026,704 | 1/1936 | Petroe | 137—495 |
| 2,134,257 | 10/1938 | Leutwiler | 137—495 |
| 3,212,523 | 10/1965 | Martin | 137—522 XR |
| 3,369,846 | 2/1968 | Scott | 303—22 |

HAROLD W. WEAKLEY, Primary Examiner

U.S. Cl. X.R.

137—505.14, 522, 529; 303—22

PO-1050
(5/69)

UNITED STATES PATENT OFFICE
CERTIFICATE OF CORRECTION

Patent No. 3,504,698               Dated April 7, 1970

Inventor(s) Richard K. Frill

It is certified that error appears in the above-identified patent and that said Letters Patent are hereby corrected as shown below:

Column 6, line 50, after "said" insert --auxiliary biasing means effective for exerting an--

Column 7, line 5, after "force" insert --acting--; line 11, "isaid" should be --said--

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents